(No Model.)
W. EVANS, Jr.
MEASURING VESSEL.
No. 385,303. Patented June 26, 1888.
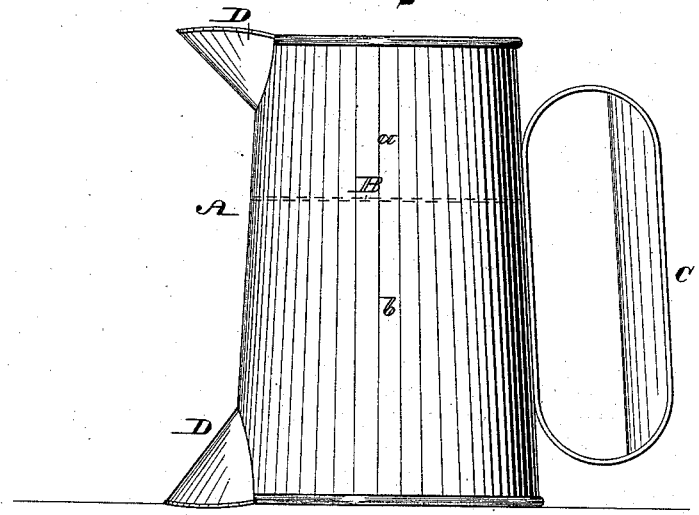
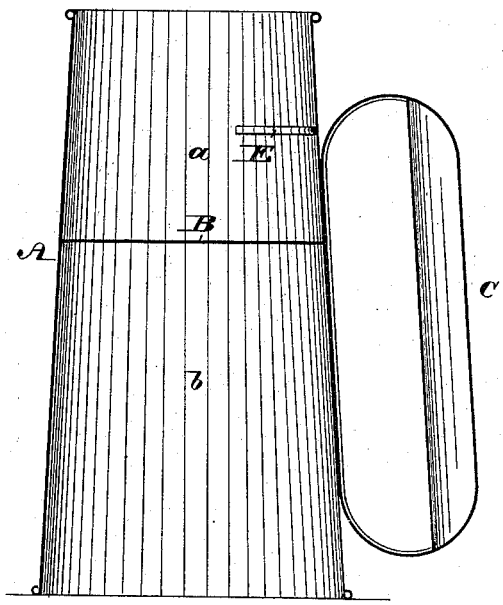
WITNESSES:
Theo. Rollé.
A. P. Jennings.
INVENTOR:
Wm Evans Jr.
BY
Hedersheim & Miller
ATTORNEYS.
N. PETERS. Photo-Lithographer, Washington, D. C.

UNITED STATES PATENT OFFICE.

WILLIAM EVANS, JR., OF PHILADELPHIA, PENNSYLVANIA.

MEASURING-VESSEL.

SPECIFICATION forming part of Letters Patent No. 385,303, dated June 26, 1888.

Application filed March 22, 1888. Serial No. 268,086. (No model.)

*To all whom it may concern:*

Be it known that I, WILLIAM EVANS, Jr., a citizen of the United States, residing in the city and county of Philadelphia, State of Pennsylvania, have invented a new and useful Improvement in Measures, which improvement is fully set forth in the following specification and accompanying drawings.

My invention consists of a measure for different quantities, as will be hereinafter fully set forth.

Figure 1 represents a side elevation of a measure embodying my invention. Fig. 2 represents a vertical section of a modification thereof.

Similar letters of reference indicate corresponding parts in the two figures.

Referring to the drawings, A represents a measure, which has secured within the same a horizontal partition, B, thus dividing the measure into two chambers or parts, $a$ $b$, the location of said partition or spacing of said parts being such that the parts constitute measures of different quantities.

It will be seen that I provide a combined or two-part measure of different quantities or capacities, and either part is available for service by properly bringing the required part to the top, it being seen that I avoid two distinct measures.

Connected with the body of the measure is a handle, C, which, as is evident, is common to the two measures and convenient for handling the measures and for overturning the same, said handle being located in order to preserve the balance of the measure. Furthermore, the outer end of each part has a spout, D, which, besides providing the pour-off, also increases the width of the base of the measure below, thus preventing overturning of the measure.

On the inner face of the part $a$ or $b$ (or both) is a mark, E, which subdivides the part into a measure of a smaller quantity.

I am aware that it is not new to construct a measure having chambers of different capacities in opposite ends thereof, and such I do not claim; but I am not aware that it is new to construct a measure as herein described and claimed.

Having thus described my invention, what I claim as new, and desire to secure by Letters Patent, is—

1. The body A, having the partition B therein, forming the two chambers $a$ $b$, in combination with the handle C, connected with the walls of both chambers and spouts on the outer ends of the chambers, said spouts constituting enlarged bases, substantially as described.

2. The body A, having the partition B therein, forming the chambers $a$ and $b$ of different capacities, and the single handle C, connected with the walls of the two chambers, said parts being combined substantially as described.

3. The measure herein described, consisting of the body A, having the partition B therein, forming the chambers $a$ $b$ of different capacities, one of said chambers having on its walls the subdivide-mark E and a single handle, C, said parts being combined and arranged substantially as described.

WILLIAM EVANS, JR.

Witnesses:
JOHN A. WIEDERSHEIM,
A. P. JENNINGS.